US012764761B2

(12) United States Patent
Zhao et al.

(10) Patent No.: US 12,764,761 B2
(45) Date of Patent: Oct. 13, 2026

(54) METHOD FOR SENDING AND RECEIVING ASSISTANCE RESOURCE SET, AND STORAGE MEDIUM

(71) Applicant: BEIJING XIAOMI MOBILE SOFTWARE CO., LTD., Beijing (CN)

(72) Inventors: Wensu Zhao, Beijing (CN); Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 644 days.

(21) Appl. No.: 18/032,525

(22) PCT Filed: Oct. 19, 2020

(86) PCT No.: PCT/CN2020/121982

§ 371 (c)(1),
(2) Date: Apr. 18, 2023

(87) PCT Pub. No.: WO2022/082382

PCT Pub. Date: Apr. 28, 2022

(65) Prior Publication Data

US 2024/0023138 A1 Jan. 18, 2024

(51) Int. Cl.
*H04W 72/25* (2023.01)
*H04W 76/14* (2018.01)

(52) U.S. Cl.
CPC ........... *H04W 72/25* (2023.01); *H04W 76/14* (2018.02)

(58) Field of Classification Search
CPC ....... H04W 72/25; H04W 76/14; H04W 4/46; H04W 4/40; H04W 4/70; H04W 72/20; H04L 5/0053
See application file for complete search history.

(56) References Cited

U.S. PATENT DOCUMENTS

2022/0053480 A1* 2/2022 Fong et al. ........... H04L 5/0094
2023/0066942 A1* 3/2023 Liu ....................... H04L 5/0053

OTHER PUBLICATIONS

European Patent Application No. 20957971.3, Search and Opinion dated Oct. 18, 2023, 8 pages.

Intel Corporation "Summary#4 for AI 7.2.4.2.2 Mode-2 Resource Allocation" 3GPP TSG RAN WG1 Meeting #98bis, R1-1911683, Oct. 2019, 40 pages.

(Continued)

*Primary Examiner* — Michael Thier
(74) *Attorney, Agent, or Firm* — Cozen O'Connor

(57) ABSTRACT

A method for sidelink communications includes sending and receiving an assistance resource set. The method for sending an assistance resource set is performed by a first device, and includes: sending first stage sidelink control information to a second device; determining second stage sidelink control information, in which the second stage sidelink control information comprises an information field for indicating an assistance resource set; and sending the second stage sidelink control information to the second device. A method for receiving an assistance resource set is performed by a second device and includes receiving first stage sidelink control information from a first device; and receiving second stage sidelink control information from the first device, wherein the second stage sidelink control information comprises an information field for indicating an assistance resources set.

12 Claims, 4 Drawing Sheets

(56) References Cited

OTHER PUBLICATIONS

PCT/CN2020/121982, English translation of Search Report dated Jul. 21, 2021, 2 pages.
Ericsson "Physical layer structure for NR sidelink" 3GPP TSG RAN WG1 #100bis-e; R1-2002232; Apr. 2020.
Xiaomi "Discussion on SCI content for 5G V2X" 3GPP TSG RAN WG1 #100bis-e; R1-2002400; Apr. 2020; 4 pages.
Zte et al. "Remaining issues of NR sidelink physical layer structure" 3GPP TSG RAN WG1 #100bis-e; R1-2001577; Apr. 2020; 10 pages.

* cited by examiner

METHOD FOR SENDING AND RECEIVING ASSISTANCE RESOURCE SET, AND STORAGE MEDIUM

CROSS-REFERENCE TO RELATED APPLICATION

This application is the U.S. national phase of International Application No. PCT/CN2020/121982, filed on Oct. 19, 2020, the entire content of which is incorporated herein by reference.

TECHNICAL FIELD

The disclosure relates to the field of communication technology, in particular to a method for sending an assistance resource set, a method for receiving an assistance resource set and an apparatus for receiving an assistance resource set, and a storage medium.

BACKGROUND

Since Long Term Evolution (LTE), the Third Generation Partnership (3GPP) has been formulating a sidelink standard for direct terminal-to-terminal communication. In July 2020, the first standard of New Radio (NR) Sidelink was completed in Rel-16. NR Sidelink is mainly used for Vehicle to Everything (V2X) and public safety. For V2X and public safety, due to time constraints, Release16 does not fully support service requirements and operation schemes. Service and System Aspects (SA) are enhanced in the Release17 NR Sidelink, such as architecture enhancement and system enhancement for supporting advanced V2X services for the 3GPP. In addition, other business cases related to the NR Sidelink are being studied by SA work groups, such as network-controlled interaction services, enhanced energy efficiency relays, wide coverage ranges, and audiovisual service production. Therefore, at the 86th plenary meeting of 3GPP, enhancements to the NR Sidelink are included as work items in project approving of the Release17, with the aim of enhancing Sidelink transmission reliability and reducing latency.

SUMMARY

According to a first aspect of embodiments of the disclosure, a method for sending an assistance resource set, performed by a first device, is provided. The method includes:

- determining second stage sidelink control information, in which the second stage sidelink control information includes an information field for indicating assistance resources; and sending the second stage sidelink control information.

According to a second aspect of the embodiment of the disclosure, a method for receiving an assistance resource set, performed by a second device, is provided. The method includes: receiving second stage sidelink control information, in which the second stage sidelink control information includes an information field for indicating assistance resources.

According to a third aspect of the embodiment of the disclosure, a device for sending an assistance resource set is provided. The device includes:

- a processor; and a memory for storing instructions executable by the processor; in which
- the processor is configured to implement the method for sending an assistance resource set of the first aspect or any one of the implementations of the first aspect.

According to a fourth aspect of the embodiment of the disclosure, a device for receiving an assistance resource set is provided. The device includes:

- a processor; and a memory for storing instructions executable by the processor; in which
- the processor is configured to implement the method for receiving an assistance resource set of the second aspect or any one of the implementations of the second aspect.

According to a fifth aspect of the embodiment of the disclosure, a non-transitory computer readable storage medium is provided. When instructions in the storage medium are executed by a processor of a mobile terminal, the mobile terminal is caused to execute the method for sending an assistance resource set of the first aspect or any one of the implementations of the first aspect.

According to a sixth aspect of the embodiment of the disclosure, a non-transitory computer readable storage medium is provided. When the instructions in the storage medium are executed by a processor of a mobile terminal, the mobile terminal is caused to execute the method for receiving an assistance resource set of the second aspect or any one of the implementations of the second aspect.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
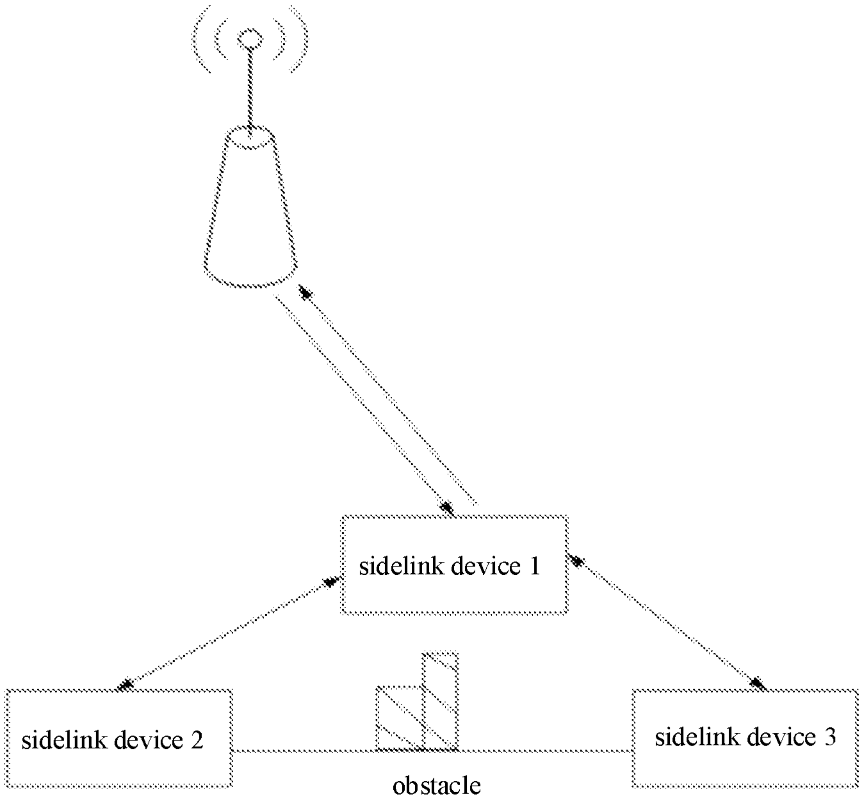
FIG. 1 illustrates a direct connection communication system according to an embodiment.

The method for sending or receiving an assistance resource set provided in embodiments of the disclosure may be performed in a sidelink system shown in FIG. 1. As shown in FIG. 1, in a sidelink scenario in which sidelink devices perform sidelink communication with each other, a network device configures various transmission parameters for data transmission for a sidelink device 1. The sidelink device 1, a sidelink device 2 and a sidelink device 3 perform sidelink communication. There may be an obstacle between the sidelink device 2 and the sidelink device 3. A communication link between the network device and a sidelink device is an up-and-down link, and a link between one sidelink device and another sidelink device is a sidelink.

In this disclosure, a communication scenario of sidelink communication between the sidelink devices can be a Vehicle to Everything (V2X) service scenario, in which V represents a vehicle-mounted device and X represents any object interacting with the vehicle-mounted device. The current X includes vehicle-mounted devices, handheld devices, traffic roadside infrastructure and network. An information mode of V2X interaction includes interactions of Vehicle to Vehicle (V2V), Vehicle to Infrastructure (V2I), Vehicle to Pedestrian (V2P), and Vehicle to Network (V2N).

With the development of new-generation of 5G mobile communication technology, 5G NR technology is used in 3GPP Rel-16 to support new V2x communication services and scenarios, such as Vehicles Platooning, Extended Sensors, Advanced Driving, and remote driving. In conclusion, 5G V2x sidelink can provide higher communication rate, shorter communication delay, and more reliable communication quality.

The communication scenario of sidelink communication between the sidelink devices may also be a Device to Device (D2D) communication scenario. The sidelink devices that perform sidelink communication in the embodiments of the disclosure may include various handheld devices, vehicle devices, wearable devices, computing devices, or other processing devices connected to a wireless modem, and various forms of User Equipment (UE), Mobile Stations (MS), terminals, and Terminal Equipment, that have wireless communication capabilities. For ease of description, the following embodiments of the disclosure are illustrated by taking the sidelink communication device as the UE.

Enhancement of the NR Sidelink can improve transmission reliability and reduce latency. In the enhancement of the NR Sidelink, in terms of enhancing Mode2 resource allocation, the 3GPP work group reached a conclusion that an approach for assisting in resource selection between user equipment is expected to be found. In this approach, two UEs are specified. For example, UE A is an assistance UE of UE B, and the UE B is a UE that may select a resource for data to be sent by the UE B itself. The UE A may determine a set of resources and sends the set of resources to the UE B by means of Mode2. The UE B may consider the set of resources sent by the UE A when performing resource selection. That is, it can be understood that the UE B uses an assistance resource set assistance mechanism to perform the resource selection. The UE B can send data to the UE A and/or other UEs.

In the enhancement of the NR Sidelink, user equipment A that is for the Sidelink communication can send an assistance resource set to user equipment B whose resource selection mode is Mode2, and the user equipment B may consider it when performing resource selection on its own data transmission.

However, in the communication mode of performing the resource selection based on the assistance resource set assistance mechanism in the related art, a sending mode and an indicating mode of the assistance resource set is not studied. That is, how the UE A sends the assistance resource set to the UE B and how the UE A indicates the assistance resource set sent to the UE B are yet to be studied. That is, there is no implementation of how the user equipment A sends the assistance resource set for resource selection.

The embodiments of the disclosure provide a method for sending an assistance resource set and a method for receiving an assistance resource set by designing a new Second stage sidelink Control Information (second SCI). The second SCI includes an information field for indicating an assistance resource set, to realize the indication of the assistance resource set. A device providing the assistance resource set sends the second SCI to a device using the assistance resource set assistance mechanism to perform resource selection, thereby realizing the sending of the assistance resource set.

In the embodiments of the disclosure, for ease of description, the device that provides the assistance resource set is referred to as a first device and the device that uses the assistance resource set assistance mechanism to perform resource selection is referred to as a second device.

Figure 2:
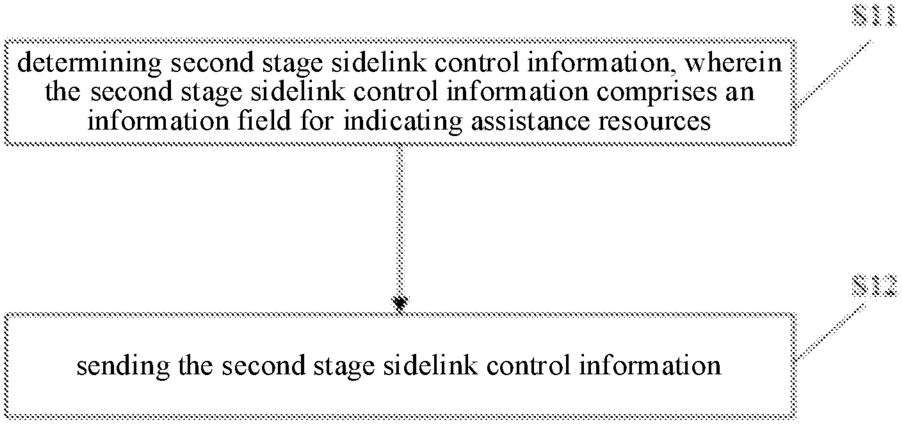
FIG. 2 is a flowchart of a method for receiving an assistance resource set according to an embodiment.

FIG. 2 is a flowchart of a method for sending an assistance resource set according to an embodiment. As shown in FIG. 2, the method for sending an assistance resource set is performed by a first device. The method includes the following steps.

At step S11, a second SCI is determined, in which the second SCI includes an information field for indicating assistance resources.

At step S12, the second SCI is sent.

In an embodiment of the disclosure, the first device determines and sends the second SCI. The second SCI includes the information field for indicating the assistance resources. Therefore, the transmission and indication of the assistance resource set can be realized based on the second SCI can be realized.

In an embodiment of the disclosure, the assistance resource set is a set of time domain resources and frequency domain resources, which may include time domain resources, frequency domain resources, and/or time-frequency resources.

In an implementation, the second SCI includes a first information field for indicating a time domain resource of the assistance resource set and a second information field for indicating a frequency domain resource of the assistance resource set.

In an embodiment of the disclosure, the first device sends the assistance resource set to the second device, and may also send data to the second device.

In an embodiment of the disclosure, the time domain resource and the frequency domain resource of the assistance resource set may be indicated by a bitmap. The second SCI may include a bit size for indicating the time domain resource of the assistance resource set and a bit size for indicating the frequency domain resource of the assistance resource set. In an embodiment of the disclosure, the bit size for indicating the time domain resource of the assistance resource set is referred to as a first bit size, and the bit size for indicating the frequency domain resource of the assistance resource set is referred to as a second bit size. That is, the first bit size corresponds to the first information field, and the second bit size corresponds to the second information field.

In an embodiment of the disclosure, the second SCI includes the first information field for indicating the time domain resource of the assistance resource set and the second information field for indicating the frequency domain resource of the assistance resource set, and also includes the first bit size corresponding to the first information field and the second bit size corresponding to the second information field.

In an implementation, in the embodiment of the disclosure, the first bit size may be determined based on a number of slots of the time domain resource of the assistance resource set and an indication granularity of the first information field. The second bit size is determined based on a number of subchannels where the frequency domain resource of the assistance resource set is located and an indication granularity of the second information field.

On the one hand, Radio Resource Control (RRC) signaling pre-configures a granularity for indicating the time domain resource of the assistance resource set, and the indication granularity of the first information field may be determined based on the granularity of the time domain resource of the assistance resource set pre-configured via the RRC signaling. On the other hand, the RRC signaling pre-configures a granularity for indicating the frequency domain resource of the assistance resource set, and the indication granularity of the second information field may be determined based on the granularity of the frequency domain resource of the assistance resource set pre-configured via the RRC signaling.

In an embodiment of the disclosure, information fields included in the second SCI may be as shown in Table 1 below.

TABLE 1

| Information field | Size (bit) |
|---|---|
| Recommend Frequency resource | $\frac{N_{subChannel}^{SL}}{\text{indication granularity}}$ |
| Recommend time resource | $\frac{Nslot}{\text{indication granularity}}$ |

In Table 1, the Recommend Frequency resource represents a frequency domain resource of the assistance resource set sent and recommended by the first device. A bitmap is used to indicate a subchannel where the frequency domain resource of the assistance resource set is located. A length (the second bit size) of the Recommend Frequency resource field is $$\frac{N_{subChannel}^{SL}}{\text{indication granularity}}.$$

For example, there are 10 subchannels in the frequency domain resource of the assistance resource set, and 1 bit is used to indicate 2 subchannels, i.e., the indication granularity is 2, thus a length (the second bit size) of a frequency domain resource field of the assistance resource set is 5 bits. A value of the indication granularity is a fixed value, and the indication granularity may be pre-configured via the RRC signaling, or may be pre-defined.

In Table 1, the Recommend time resource represents a time domain resource of the assistance resource set sent and recommended by the first device. A bitmap is used to indicate a slot where the time domain resource of the assistance resource set is located. A length (a bit size) corresponding to the Recommend time field is $$\frac{Nslot}{\text{indication granularity}}.$$

For example, a number of slots occupied by the time domain resource of the assistance resource set sent and recommended by the first device is 10 slots, and 1 bit is used to indicate 2 slots, i.e., the indication granularity is 2, thus a length (the first bit size) of a time domain resource field of the assistance resource set is 5 bits. A value of the indication granularity is a fixed value, and may be pre-configured via the RRC signaling, or may be pre-defined.

In an embodiment of the disclosure, the second SCI includes the first information field for indicating the time domain resource of the assistance resource set and the second information field for indicating the frequency domain resource of the assistance resource set, so as to indicate both the time domain resource and the frequency domain resource of the assistance resource set, and to indicate the time domain resource and the frequency domain resource of the assistance resource set in a very precise indication manner.

In an implementation of embodiments of the disclosure, the assistance resource set contains a recommended time domain resource. The second SCI includes the first information field for indicating the time domain resource of the assistance resource set, so as to indicate the time domain resource of the assistance resource set.

The time domain resource in the assistance resource set can be determined by the second device through demodulating SCI and measuring Reference Signal Receiving Power (RSRP) of a Demodulation Reference Signal (DMRS) in mode2. This indication mode may reduce overhead of the control information, and is suitable for solving half-duplex problems.

For example, the second SCI according to the embodiment of the disclosure includes an information field of Recommend Time resource information. The second SCI also includes the first bit size corresponding to the first information field. The first bit size is determined based on the number of slots of the time domain resource in the assistance resource set and the indication granularity of the first information field.

In an implementation, the indication granularity of the first information field may be pre-configured via the RRC signaling or may be predefined. For example, the indication granularity of the first information field pre-configured or pre-defined via the RRC signaling is n. For example, if the indication granularity of the first information field is that 1 bit indicates 2 slots, n=2.

In an implementation, the time domain resource of the assistance resource set in the embodiment of the disclosure may be all or part of consecutive time domain resources within a resource selection window of the second device, and has a specified time domain resource range. The time domain resource range of the time domain resource of the assistance resource set may be indicated in different ways.

In an implementation, the time domain resource of the assistance resource set includes a time domain resource of a first time domain length starting from a first start position. The first start position is a start position of a resource selection window of a second device.

The first time domain length is pre-configured via the RRC signaling and can be, for example, a resource usage condition in a fixed number (i.e., m) of slots, e.g., m=20.

Figure 3:
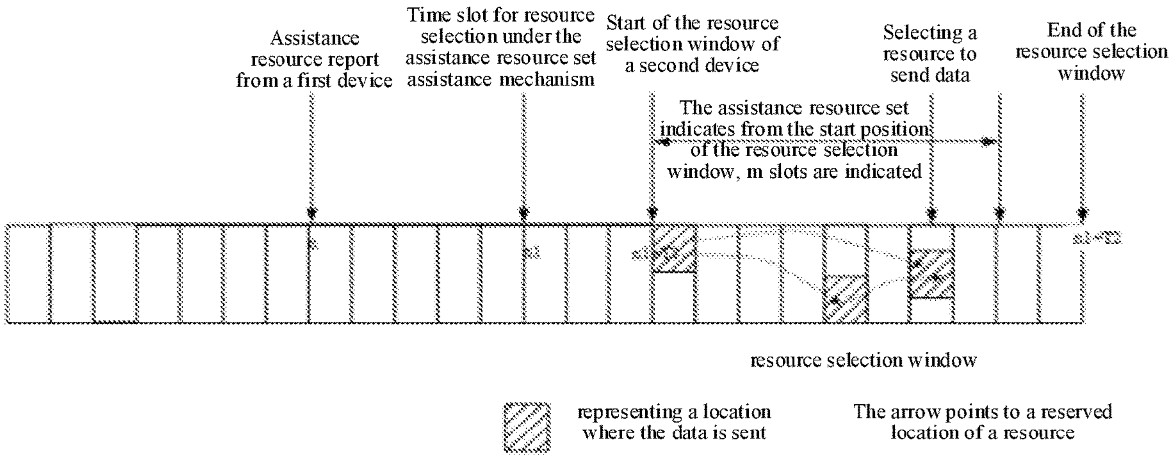
FIG. 3 is a schematic diagram of an indication range of a time domain resource of an assistance resource set according to an embodiment of the disclosure.

FIG. 3 is a schematic diagram of an indication range of a time domain resource of an assistance resource set according to an embodiment of the disclosure. As shown in FIG. 3, the indication range of the time domain resource of the assistance resource set starts from the start position of the resource selection window of the second device. The indication range is at a fixed portion of the slots in the resource selection window, but not beyond an end of the resource selection window of the second device at slot position n1+T2. The resource selection window of the second device in the R16 standard is [n1+T1, n1+T2]. The n1 is a slot for the second device to perform resource selection under the assistance resource set assistance mechanism. The values of T2 are different for different devices. Further, in the embodiments of the disclosure, a fixed-length bit value may be used to indicate the usage condition of the time domain resource that are within the resource selection window of the second device, such as indicating a usage condition of resource in a fixed number (i.e., m) of slots starting from the resource selection window of the second device, e.g., m=20. The first device determines the start position of the resource selection window of the second device through a physical layer control signaling sent by the second device.

In an implementation, the time domain resource of the assistance resource set includes a time domain resource of a first time domain length starting from a second start position. The second start position is a position of a preset slot offset after a time point of sending an assistance resource report. That is, an indication range of the time domain resource of the assistance resource set is a usage condition of a resource starting from slot n+ΔT, and ΔT is the preset slot offset.

In the embodiment of the disclosure, the preset slot offset is a preset fixed offset, or the preset slot offset is determined based on a pre-configured set of slot offsets, which may be, for example, a subset of the pre-configured set of slot offsets.

Figure 4:
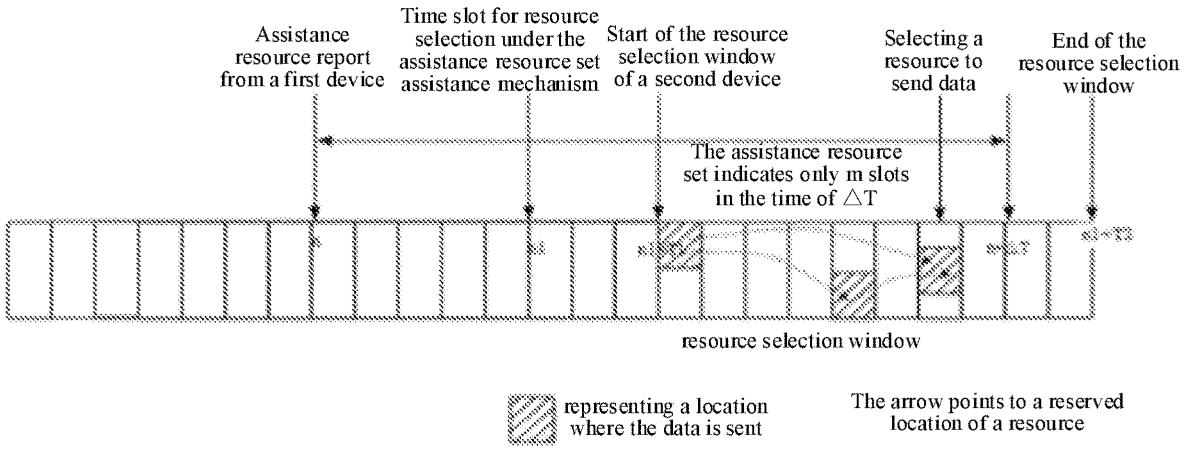
FIG. 4 is a schematic diagram of an indication range of a time domain resource of an assistance resource set according to an embodiment of the disclosure.

FIG. 4 is a schematic diagram of an indication range of a time domain resource of an assistance resource set according to an embodiment of the disclosure. As shown in FIG. 4, the indication range of the time domain resource of the assistance resource set is the usage condition of the resource starting from the slot n+ΔT, and ΔT is the slot offset. The slot offset is understood as a duration in which the second device processes the assistance resource set from the first device. When the second device receives the assistance resource set from the first device at a slot n, it determines that the assistance resource set is the usage condition of the resource starting from the slot n+ΔT. The first time domain length indicated by the time domain resource of the assistance resource set is a slot resource condition of a first slot length m still starting from the slot n+ΔT, but not exceeding an end slot position n1+T2 of the resource selection window of the second device. The indication range of the time domain resource of the assistance resource set is the usage condition of the resource starting from the slot n+ΔT, so that the signaling overhead for indicating the assistance resource set is relatively small.

In an implementation of the embodiment of the disclosure, ΔT is a fixed value. In another implementation, ΔT is a flexible value. In an example, ΔT is a certain ΔT in the pre-configured set of slot offsets. For example, ΔT is a pre-configured set {ΔT1, ΔT2, ΔT3, ΔT4}. In the second SCI, an offset field can be added to indicate a specific value of ΔT. For example, if there are multiple assistance resource sets sent by the first device to the second device, 2 bits are used to indicate the specific value of ΔT. Different ΔT indicate different assistance resource sets sent by the first device to the second device.

In an embodiment of the disclosure, the indication range of the time domain resource in the assistance resource set may include the following three manners.

Manner 1: the indication range is a range of a resource usage condition in a fixed number (m) of slots starting from the resource selection window of the UE B.

Manner 2: the indication range is a range of a resource usage condition in a fixed number (m) of m slots starting from the slot n+ΔT, and ΔT is the pre-configured fixed offset value.

Manner 3: the indication range is a range of a resource usage condition in a fixed number (m) of m slots starting from the slot n+ΔT, and ΔT is the pre-configured set of offsets.

The above-mentioned m slots in the embodiments of the disclosure may be understood as all slot resources or part of slot resources in the resource selection window of the second device, and the all slot resources or the part of slot resources are consecutive slot resources.

In an embodiment of the disclosure, the second SCI involved may be understood as the second SCI dedicated to indicating the assistance resource set.

In an implementation, the second SCI dedicated to indicating the assistance resource set may be newly designed in an embodiment of the disclosure, which is referred to hereinafter as new second SCI.

In an example, in this embodiment of the disclosure, the first device sends the new second SCI to the second device, and the new second SCI carries assistance resource set information, so as to send the assistance resource set to the second device.

In an implementation, after the first device sends first SCI, the first device sends the assistance resource set independently in a form of the second SCI. That is, the first device sends the assistance resource set to the second device and does not send data to the second device at the same time. That is, the new second SCI sent by the first device to the second device in this embodiment of the disclosure does not need to include information fields related to scheduling data in SCI2-A and SCI2-B.

In an embodiment of the disclosure, fields in the first SCI are directly transmitted on a control channel without modification, and the new second SCI2 (for example, referred to as second SCI2-C) is designed. The new second SCI 2-C carries an information field indicating the assistance resource set, namely, a field of assistance resource set time domain resource and an information field of assistance resource set frequency domain resource information in Table 1.

In an implementation, the new second SCI2-C also includes a destination ID and a source ID of the assistance resource set. In the embodiment of the disclosure, the new second SCI2-C includes the destination ID and the source ID. When the assistance resource set sent by the first device is used by multiple second devices, the destination ID and the source ID can be used to indicate which second device the assistance resource set is sent to and which first device sends the assistance resource set.

In an implementation, the new second SCI2-C includes a first information field for indicating the time domain resource of the assistance resource set and a second information field for indicating the frequency domain resource of the assistance resource set, i.e., an information field of Recommend Frequency resource information and an information field of Recommend time resource information, to indicate the time domain resource and the frequency domain resource recommended by the first device to the second device. In this way, by indicating both the time domain resource and the frequency domain resource of the assistance resource set, the assistance resource set can be indicated relatively accurately. The new second SCI2-C also includes a field of Destination ID and a field of Source ID. The new second SCI2-C also includes a bit size corresponding to each information field. The information fields included in the new second SCI2-C are shown in the following Table 2.

TABLE 2

| Information field | Size (bit) |
|---|---|
| Recommend Frequency resource | $\frac{N^{SL}_{subChannel}}{\text{indication granularity}}$ |
| Recommend time resource | $\frac{Nslot}{\text{indication granularity}}$ |
| Destination ID | 16 |
| Source ID | 8 |

In an alternative implementation, the new second SCI2-C includes a first information field for indicating the time domain resource of the assistance resource set. That is, the assistance resource set contains the recommended time domain resource, and only the time domain resource may be indicated. It is understood that, although the frequency domain resource is not indicated in the assistance resource set, the second device may determine it by demodulating SCI and measuring RSRP of DMRS in Mode 2. This way of indicating the time domain resource of the assistance resource set can reduce the overhead of control information and solve the half-duplex problem. The new second SCI2-C also includes a field of destination ID and a field of source ID. The new second SCI2-C also includes a bit size corresponding to each information field. The information fields included in the new second SCI2-C are shown in the following Table 3.

TABLE 3

| Information field | Size (bit) |
|---|---|
| Recommend time resource | $\frac{Nslot}{\text{indication granularity}}$ |
| Destination ID | 16 |
| Source ID | 8 |

In another embodiment of the disclosure, the second SCI for indicating the assistance resource set may be a new second SCI designed by adding an information field for indicating the assistance resource set to the existing first SCI. For example, it may still be called second SCI 2-C.

In an example, in an embodiment of the disclosure, the existing two-stage SCI transmission mode of V2X is used to send the assistance resource set. That is, the information fields in the existing first SCI are unchanged, and a new second SCI is added. The existing first SCI includes bits (00 and 01) for indicating the second SCI, i.e., bits for indicating second SCI 2-A and second SCI 2-B. R16 reserves two types of bits (10 and 11) to design a new second SCI. That is, the first SCI includes a new type of bits (10 and 11) to indicate a new second SCI that is different from second SCI 2-A and second SCI 2-B. Based on the existing second SCI 2-A and second SCI 2-B, information fields related to the assistance resource set are added, and the time domain resource and the frequency domain resource of the assistance resource set sent by the first device to the second device are indicated by a bitmap. That is, in the embodiment of this disclosure, the newly designed second SCI includes a first information field for indicating the time domain resource of the assistance resource set, a second information field for indicating the frequency domain resource of the assistance resource set, and related information fields of the second SCI 2-A and the second SCI 2-B.

In an example, in an embodiment of the disclosure, information fields of the Recommend Frequency resource and the Recommend Time resource are added to the existing second SCI. In this solution, when the assistance resource set is sent along with the data, the control information is to schedule transmission of the data. The existing information fields of the second SCI 2-A and the second SCI 2-B are used for Hybrid Automatic Repeat reQuest (HARD) feedback of data, so the information fields of the Recommend Frequency resource and the Recommend Time resource may be added to the existing second SCI 2-A and the second SCI 2-B.

For example, if the information fields of the Recommend Frequency resource and the Recommend time resource are added to the existing Second SCI2-A, information fields in Table 4 below are obtained. That is, a new Second SCI 2-C is designed. If the Recommend Frequency resource and the Recommended time resource are added to the existing Second SCI 2-B, information fields in the following Table 5 are obtained, and a new Second SCI 2-D is designed.

TABLE 4

| Information field | Size (bit) |
|---|---|
| HARQ process number | $\lceil \log_2 N_{process} \rceil$ |
| New data indicator | 1 bit |
| Redundancy version | 2 bit |
| Source ID | 8 bit |
| Destination ID | 16 bit |
| HARQ feedback enabled/ disabled indicator | 1 bit |
| Cast type indicator | 2 bit |
| CSI request | 1 bit |
| Recommend Frequency resource | $\frac{N^{SL}_{subChannel}}{\text{indication granularity}}$ |
| Recommend time resource | $\frac{Nslot}{\text{indication granularity}}$ |

TABLE 5

| Information field | Size (bit) |
|---|---|
| HARQ process number | $\lceil \log_2 N_{process} \rceil$ |
| New data indicator | 1 bit |
| Redundancy version | 2 bit |
| Source ID | 8 bit |
| Destination ID | 16 bit |
| HARQ feedback enabled/ disabled indicator | 1 bit |
| Recommend Frequency resource | $\frac{N^{SL}_{subChannel}}{\text{indication granularity}}$ |

TABLE 5-continued

| Information field | Size (bit) |
| --- | --- |
| Recommend time resource | $\frac{Nslot}{\text{indication granularity}}$ |

With the above method for sending an assistance resource set provided in the embodiment of the disclosure, the new second SCI carrying the assistance resource set sent by the first device to the second device is designed. The resource set recommended for data transmission performed by the second device is indicated in the assistance resource set. The new second SCI indicates both the time domain resource and the frequency domain resource of the assistance resource set, or only indicates the time domain resource of the assistance resource set.

Moreover, the frequency domain resource in the assistance resource set is indicated by a bitmap. A frequency domain indication range is recommended frequency domain resources within a range of subchannels used by the UE A. An indication granularity for indicating the frequency domain resource is pre-configured by the RRC signaling. The time domain resource in the assistance resource set is also indicated using a bitmap. An indication granularity for indicating the time domain resource is pre-configured by the RRC signaling. The indicated time domain length pre-configured by RRC signaling is m slots.

In an embodiment of the disclosure, the second device receives the second SCI sent by the first device, and can perform resource selection based on the second SCI.

Figure 5:
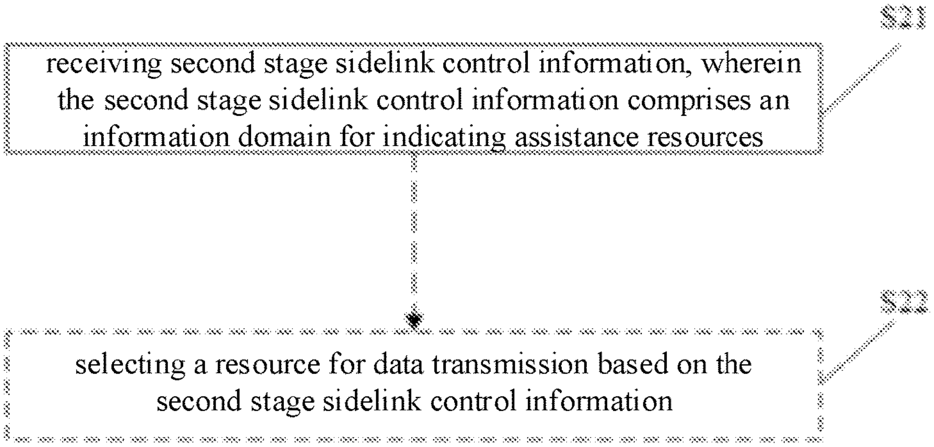
FIG. 5 is a flowchart of a method for receiving an assistance resource set according to an embodiment.

FIG. 5 is a flowchart of a method for receiving an assistance resource set according to an embodiment. As shown in FIG. 5, the method for receiving an assistance resource set is performed by a second device. The method includes the following step.

At step S21, second SCI is received, the second SCI includes an information field for indicating assistance resources.

In an embodiment of the disclosure, the second SCI received by the second device has the same format as the second SCI sent by the first device.

In an implementation, the second SCI includes a first information field for indicating a time domain resource of the assistance resource set and a second information field for indicating a frequency domain resource of the assistance resource set.

In an implementation, the second SCI further includes a first bit size corresponding to the first information field and a second bit size corresponding to the second information field.

In an implementation, the first bit size is determined based on a number of slots of the time domain resource of the assistance resource set and an indication granularity of the first information field, and the second bit size is determined based on a number of subchannels where the frequency domain resource of the assistance resource set is located and an indication granularity of the second information field.

In an implementation, the second SCI includes a first information field for indicating a time domain resource of the assistance resource set.

In an implementation, the time domain resource of the assistance resource set includes a time domain resource of a first time domain length starting from a first start position, in which the first start position is a start position of a resource selection window of a second device.

In an implementation, the time domain resource of the assistance resource set includes a time domain resource of a first time domain length starting from a second start position, in which the second start position is a position of a preset slot offset after a time point of sending an assistance resource report.

In an implementation, the time domain resource of the assistance resource set includes all or part of slot resources located in the resource selection window of the second device, and the all or part of slot resources are consecutive slot resources.

In an implementation, the first time domain length is pre-configured via a RRC signaling.

In an implementation, the preset slot offset is a preset fixed offset, or the preset slot offset is determined based on a pre-configured set of slot offsets.

In an implementation, the second SCI further includes a destination ID and a source ID of the assistance resource set.

In an implementation, the information field for indicating the assistance resources in the second SCI is indicated by a reserved bit for an information field of a second SCI format in first SCI.

In an implementation, the second SCI further includes second SCI2-A or second SCI2-B.

It is understood that the description of the second SCI received by the second device in the embodiment of this disclosure can refer to the related description of the second SCI sent by the first device in the above-mentioned embodiments, and will not be described in detail here.

In an embodiment of the disclosure, after the second device receives the second SCI, the method further includes the following steps.

At step S22, a resource for data transmission is selected based on the second SCI.

It is understood that the method for sending an assistance resource set and the method for receiving an assistance resource set provided by the embodiments of the disclosure can be used in a process of interaction between the first device and the second device for sending and receiving the assistance resource set. In the process of sending and receiving the assistance resource set during interaction between the first device and the second device, the first device and the second device have the corresponding functions to realize the method for sending an assistance resource set and the method for receiving an assistance resource set involved in the above embodiments, which is not limited in the embodiments of the disclosure.

Based on the same inventive concepts, the embodiments of the disclosure also provide an apparatus for sending an assistance resource set and an apparatus for receiving an assistance resource set.

It is understood that in order to achieve the aforementioned functions, the apparatus for sending an assistance resource set and the apparatus for receiving an assistance resource set provided in embodiments of the disclosure contain hardware structures and/or software modules that perform the respective functions. In combination with the units and algorithmic steps of each example disclosed in the embodiments of the disclosure, the embodiments of the disclosure can be implemented in the form of hardware or a combination of hardware and computer software. Whether a particular function is performed as hardware or hardware driven by computer software depends on the particular application and design constraints of the technical solution. Those skilled in the art may use different approaches for each particular application to implement the described function, but such implementation should not be considered outside the scope of the technical solutions of the embodiments of the disclosure.

Figure 6:
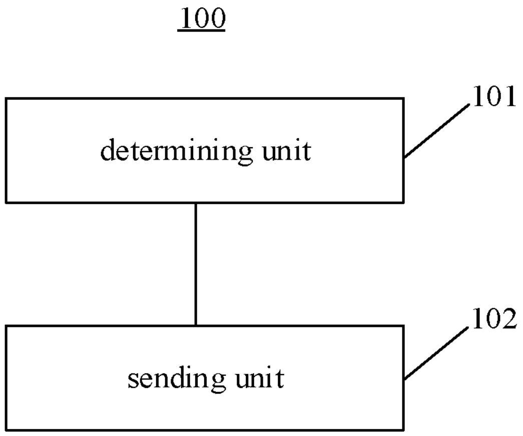
FIG. 6 is a block diagram of an apparatus for sending an assistance resource set according to an embodiment.

FIG. 6 is a block diagram of an apparatus for sending an assistance resource set according to an embodiment. As shown in FIG. 6, the apparatus 100 for sending an assistance resource set is implemented by a first device. The apparatus 100 includes: a determining unit 101 and a sending unit 102.

The determining unit 101 is configured to determine second SCI, in which the second SCI includes an information field for indicating assistance resources. The sending unit 102 is configured to send the second SCI.

In an implementation, the second SCI includes a first information field for indicating a time domain resource of the assistance resource set and a second information field for indicating a frequency domain resource of the assistance resource set.

In an implementation, the second SCI further includes a first bit size corresponding to the first information field and a second bit size corresponding to the second information field.

In an implementation, the first bit size is determined based on a number of slots of the time domain resource of the assistance resource set and an indication granularity of the first information field, and the second bit size is determined based on a number of subchannels where the frequency domain resource of the assistance resource set is located and an indication granularity of the second information field.

In an implementation, the second SCI includes a first information field for indicating a time domain resource of the assistance resource set.

In an implementation, the time domain resource of the assistance resource set includes a time domain resource of a first time domain length starting from a first start position, in which the first start position is a start position of a resource selection window of a second device.

In an implementation, the time domain resource of the assistance resource set includes a time domain resource of a first time domain length starting from a second start position, in which the second start position is a position of a preset slot offset after a time point of sending an assistance resource report.

In an implementation, the time domain resource of the assistance resource set includes all or part of slot resources located in the resource selection window of the second device, and the all or part of slot resources are consecutive slot resources.

In an implementation, the first time domain length is pre-configured via a RRC signaling.

In an implementation, the preset slot offset is a preset fixed offset, or the preset slot offset is determined based on a pre-configured set of slot offsets.

In an implementation, the second SCI further includes a destination ID and a source ID of the assistance resource set.

In an implementation, the information field for indicating the assistance resource in the second SCI is indicated by a reserved bit for an information field of a second SCI format in first SCI.

In an implementation, the second SCI further includes second SCI A or second SCI B.

Figure 7:
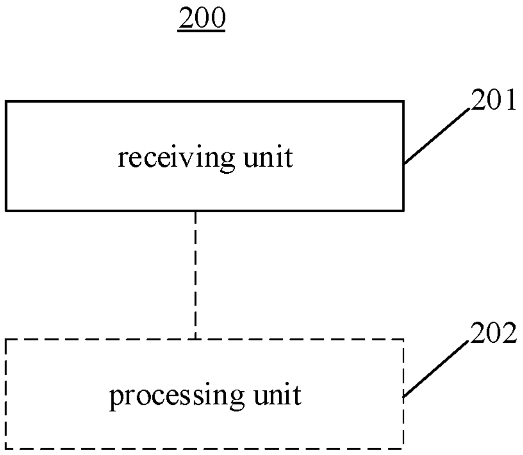
FIG. 7 is a block diagram of an apparatus for receiving an assistance resource set receiving apparatus according to an embodiment.

FIG. 7 is a block diagram of an apparatus for receiving an assistance resource set according to an embodiment. As shown in FIG. 7, the apparatus 200 for receiving an assistance resource set is implemented by a second device. The apparatus 200 includes: a receiving unit 201.

The receiving unit 201 is configured to receive second SCI, in which the second SCI includes an information field for indicating assistance resources.

In an implementation, the second SCI includes a first information field for indicating a time domain resource of the assistance resource set and a second information field for indicating a frequency domain resource of the assistance resource set.

In an implementation, the second SCI further includes a first bit size corresponding to the first information field and a second bit size corresponding to the second information field.

In an implementation, the first bit size is determined based on a number of slots of the time domain resource of the assistance resource set and an indication granularity of the first information field, and the second bit size is determined based on a number of subchannels where the frequency domain resource of the assistance resource set is located and an indication granularity of the second information field.

In an implementation, the second SCI includes a first information field for indicating a time domain resource of the assistance resource set.

In an implementation, the time domain resource of the assistance resource set includes a time domain resource of a first time domain length starting from a first start position, in which the first start position is a start position of a resource selection window of a second device.

In an implementation, the time domain resource of the assistance resource set includes a time domain resource of a first time domain length starting from a second start position, in which the second start position is a position of a preset slot offset after a time point of sending an assistance resource report.

In an implementation, the time domain resource of the assistance resource set includes all or part of slot resources located in the resource selection window of the second device, and the all or part of slot resources are consecutive slot resources.

In an implementation, the first time domain length is pre-configured via a RRC signaling.

In an implementation, the preset slot offset is a preset fixed offset, or the preset slot offset is determined based on a pre-configured set of slot offsets.

In an implementation, the second SCI further includes a destination ID and a source ID of the assistance resource set.

In an implementation, the information field for indicating the assistance resources in the second SCI is indicated by a reserved bit for an information field of a second SCI format in first SCI.

In an implementation, the second SCI further includes second SCI A or second SCI B.

In an implementation, the apparatus 200 further includes: a processing unit 202. The processing unit 202 is configured to select a resource for data transmission based on the second SCI.

Regarding the apparatuses in the above embodiments, the specific way in which each module performs its operation have been described in detail in the embodiments concerning the methods, and will not be described in detail here.

Figure 8:
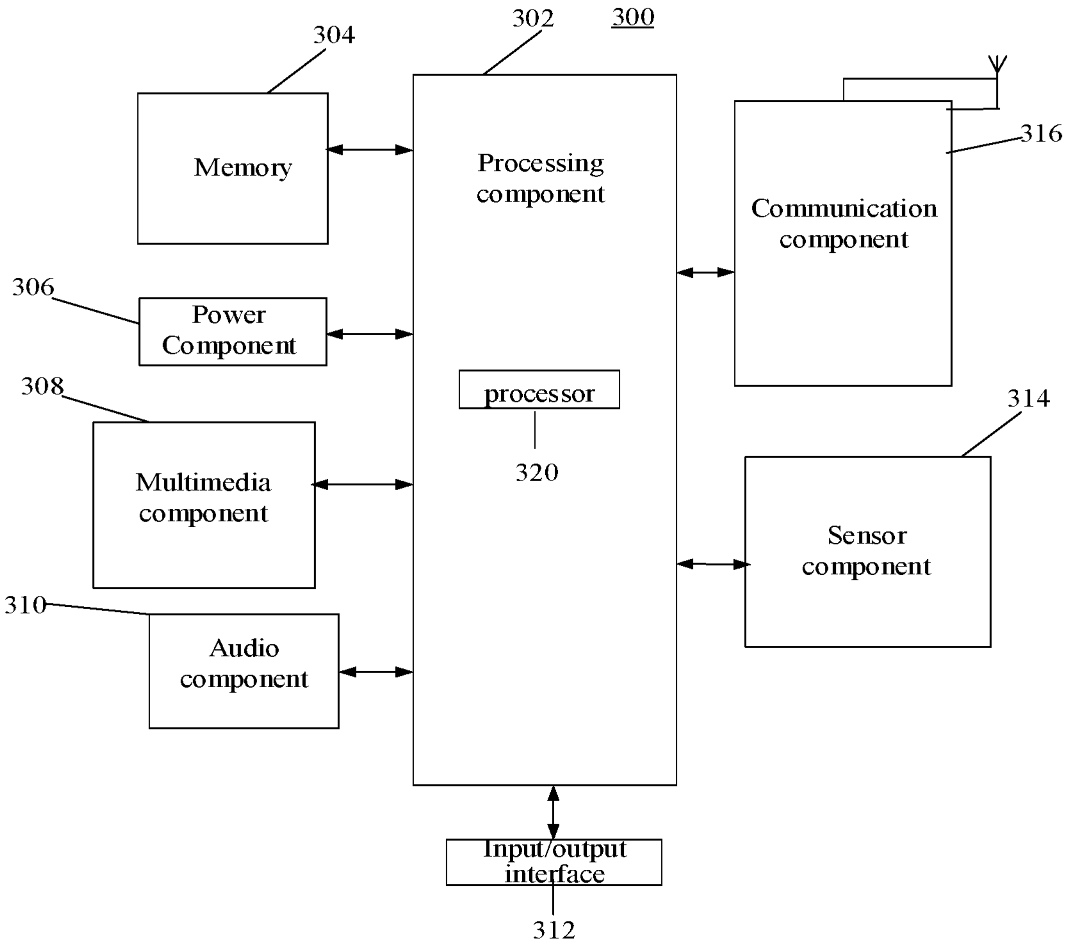
FIG. 8 is a block diagram of a device for sending or receiving an assistance resource set according to an embodiment.

FIG. 8 is a block diagram of a device 300 for sending or receiving an assistance resource set according to an embodiment. For example, the device 300 can be a mobile phone, a computer, a digital broadcast terminal, a message sending and receiving device, a game console, a tablet device, a medical device, a fitness device, or a personal digital assistant.

As shown in FIG. 8, the device 300 includes one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a Complementary Metal Oxide Semiconductor (CMOS) or Charge-Coupled Device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G or 3G, or a combination thereof. In an exemplary embodiment, the communication component 316 receives a broadcast signal or broadcast associated information from an external broadcast management system via a broadcast channel. In an exemplary embodiment, the communication component 316 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the exemplary embodiment, the device 300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the exemplary embodiments, there is also provided a non-transitory computer readable storage medium including instructions, such as the memory 304, executable by the processor 320 in the device 300, for performing the above method. For example, the non-transitory computer-readable storage medium may be a ROM, a Random Access Memory (RAM), a CD-ROM, a magnetic tape, a floppy disc, and an optical data storage device.

It may be further understood that the term "plurality" in the disclosure refers to two or more, and that other quantifiers are similar. The term "and/or" describes the association relation of associated objects, indicating that there may be three types of relations, for example, A and/or B, which may mean: A exists alone, A and B both exist, or B exists alone. The character "/" generally indicates an "or" relation between the preceding and following associated objects. The singular forms "a", "said" and "the" are also intended to include plural forms, unless the context clearly indicates otherwise.

It is also understood that the terms "first", and "second", etc. are used to describe various types of information, but such information should not be limited to these terms. These terms are used only to distinguish information of the same type from one another and do not indicate a particular order or level of importance. In fact, the expressions "first", and "second" can be used interchangeably. For example, without departing from the scope of this disclosure, first information may also be referred to as second information. Similarly, the second information may also be referred to as the first information.

It is further understood that although the operations are depicted in the accompanying drawings in a particular order in the embodiments of the disclosure, it should not be understood that the operations need to be performed in the shown particular order or in a sequential order, or that all of the operations shown need to be performed to obtain the desired results. Multitasking and parallel processing may be advantageous in particular environments.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the precise structures that has been described above and illustrated in the accompanying drawings, and that various modifications and changes can be made without departing from the scope thereof. The scope of the disclosure is only be limited by the appended claims.

What is claimed is:

1. A method for sending an assistance resource set, comprising:

sending first stage sidelink control information to a second device;

determining second stage sidelink control information, wherein the second stage sidelink control information comprises an information field for indicating an assistance resource set; and sending the second stage sidelink control information to the second device, wherein the second stage sidelink control information is configured to assist the second device in resource selection;

wherein the second stage sidelink control information comprises:

a first information field for indicating a time domain resource of the assistance resource set, wherein a first bit size corresponding to the first information field is determined based on a number of slots of the time domain resource of the assistance resource set and an indication granularity of the first information field; and a second information field for indicating a frequency domain resource of the assistance resource set, wherein a second bit size corresponding to the second information field is determined based on a number of subchannels where the frequency domain resource of the assistance resource set is located and an indication granularity of the second information field.

2. The method of claim 1, wherein the second stage sidelink control information further comprises a destination ID and a source ID of the assistance resource set.

3. The method of claim 1, wherein the second stage sidelink control information carrying the assistance resource set is indicated by an information field of a second stage sidelink control information format in the first stage sidelink control information.

4. The method of claim 3, wherein the second stage sidelink control information further comprises second stage sidelink control information A or second stage sidelink control information B used for Hybrid Automatic Repeat reQuest (HARQ) feedback of data.

5. The method of claim 1, wherein the second stage sidelink control information is different from second stage sidelink control information 2-A and second stage sidelink control information 2-B used for HARQ feedback of data.

6. A method for receiving an assistance resource set, performed by a second device, comprising:

receiving first stage sidelink control information from a first device; and receiving second stage sidelink control information from the first device, wherein the second stage sidelink control information comprises an information field for indicating an assistance resource set, and the second stage sidelink control information is configured to assist the second device in resource selection;

wherein the second stage sidelink control information comprises:

a first information field for indicating a time domain resource of the assistance resource set, wherein a first bit size corresponding to the first information field is determined based on a number of slots of the time domain resource of the assistance resource set and an indication granularity of the first information field; and a second information field for indicating a frequency domain resource of the assistance resource set, wherein a second bit size corresponding to the second information field is determined based on a number of subchannels where the frequency domain resource of the assistance resource set is located and an indication granularity of the second information field.

7. The method of claim 6, wherein the second stage sidelink control information further comprises a destination ID and a source ID of the assistance resource set.

8. The method of claim 6, wherein the second stage sidelink control information carrying the assistance resource set is indicated by an information field of a second stage sidelink control information format in first stage sidelink control information.

9. The method of claim 6, further comprising:

selecting a resource for data transmission based on the second stage sidelink control information.

10. An assistance resource set receiving device, comprising:

a processor;

a memory for storing instructions executable by the processor; wherein the processor is configured to implement the method for receiving an assistance resource set of claim 6.

11. The method of claim 6, wherein the second stage sidelink control information is different from second stage sidelink control information 2-A and second stage sidelink control information 2-B used for HARQ feedback of data.

12. A device for sending an assistance resource set, comprising:

a processor;

a memory for storing instructions executable by the processor; wherein the processor is configured to implement a method for sending an assistance resource set, the method comprising:

sending first stage sidelink control information to a second device;

determining second stage sidelink control information, wherein the second stage sidelink control information comprises an information field for indicating an assistance resource set; and sending the second stage sidelink control information to the second device, wherein the second stage sidelink control information is configured to assist the second device in resource selection;

wherein the second stage sidelink control information comprises:

a first information field for indicating a time domain resource of the assistance resource set, wherein a first bit size corresponding to the first information field is determined based on a number of slots of the time domain resource of the assistance resource set and an indication granularity of the first information field; and a second information field for indicating a frequency domain resource of the assistance resource set, wherein a second bit size corresponding to the second information field is determined based on a number of subchannels where the frequency domain resource of the assistance resource set is located and an indication granularity of the second information field.

* * * * *